(12) United States Patent
Hirata et al.

(10) Patent No.: US 8,893,759 B2
(45) Date of Patent: *Nov. 25, 2014

(54) SYSTEM FOR MANUFACTURING LIQUID CRYSTAL DISPLAY DEVICE

(71) Applicant: Nitto Denko Corporation, Ibaraki (JP)

(72) Inventors: Satoshi Hirata, Ibaraki (JP); Seiji Kondo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,536

(22) Filed: Feb. 7, 2013

(65) Prior Publication Data

US 2013/0153155 A1   Jun. 20, 2013

Related U.S. Application Data

(62) Division of application No. 13/038,076, filed on Mar. 1, 2011.

(30) Foreign Application Priority Data

Sep. 30, 2010  (JP) ................... 2010-222035
Nov. 2, 2010   (JP) ................... 2010-246501

(51) Int. Cl.
*B32B 38/18*   (2006.01)
*G02F 1/13*    (2006.01)
*G02F 1/1335*  (2006.01)

(52) U.S. Cl.
CPC .......... *B32B 38/1808* (2013.01); *G02F 1/1303* (2013.01); *G02F 1/133528* (2013.01)
USPC .......................................... 156/517; 156/538

(58) Field of Classification Search
CPC .... B32B 2457/202; B32B 37/02; B32B 41/00
USPC ............................................ 156/517, 538, 60
See application file for complete search history.

(56) References Cited

U.S. PATENT DOCUMENTS 7,708,855 B2 *  5/2010  Priewasser .................... 156/264
8,172,631 B2 *  5/2012  Hirata et al. ..................... 445/24

(Continued)

FOREIGN PATENT DOCUMENTS

CN       2854642 Y  *  1/2007
CN     101298204 A     11/2008

(Continued)

OTHER PUBLICATIONS

Taiwanese Office Action dated Sep. 27, 2011, issued in corresponding Taiwanese Patent Application No. 099141059.

(Continued)

*Primary Examiner* — Margaret Squalls
(74) *Attorney, Agent, or Firm* — Westerman, Hattori, Daniels & Adrian, LLP

(57) ABSTRACT

A system for manufacturing a liquid crystal display device, comprising a panel turning mechanism that has: a long side-supporting part for supporting the liquid crystal panel by coming into contact with an end face along at least one long side of the liquid crystal panel; and a short side-supporting part for supporting the liquid crystal panel by coming into contact with an end face along at least one short side of the liquid crystal panel and is configured to turn over the liquid crystal panel about an axis not parallel to any of the long and short sides of the liquid crystal panel in such a manner that the positional relationship between the long and short sides is reversed while both the long and short sides are supported.

8 Claims, 17 Drawing Sheets

(56) References Cited

U.S. PATENT DOCUMENTS

| | | | |
|---|---|---|---|
| 8,317,961 B2 * | 11/2012 | Kitada et al. | 156/257 |
| 8,376,012 B2 * | 2/2013 | Kadota | 156/361 |
| 8,508,697 B2 | 8/2013 | Hirata et al. | |
| 2004/0241344 A1 | 12/2004 | Kawanishi et al. | |
| 2005/0016670 A1 | 1/2005 | Kanbara et al. | |
| 2006/0124248 A1 | 6/2006 | Kanbara et al. | |
| 2009/0218049 A1 | 9/2009 | Kanbara et al. | |
| 2009/0263608 A1 | 10/2009 | Kitada et al. | |
| 2010/0011566 A1 * | 1/2010 | Kim et al. | 29/592.1 |
| 2010/0186890 A1 | 7/2010 | Kitada et al. | |
| 2010/0206977 A1 | 8/2010 | Kitada et al. | |
| 2010/0212822 A1 | 8/2010 | Kitada et al. | |
| 2010/0258250 A1 | 10/2010 | Kitada et al. | |
| 2010/0282406 A1 | 11/2010 | Kitada et al. | |
| 2010/0300606 A1 | 12/2010 | Kitada et al. | |
| 2011/0104423 A1 * | 5/2011 | Kitada et al. | 428/41.8 |
| 2011/0126988 A1 | 6/2011 | Kitada et al. | |
| 2012/0067500 A1 * | 3/2012 | Nishioka | 156/60 |
| 2012/0071058 A1 | 3/2012 | Hirata et al. | |
| 2012/0080145 A1 * | 4/2012 | Hirata et al. | 156/249 |
| 2013/0008581 A1 * | 1/2013 | Yuki et al. | 156/60 |
| 2013/0037219 A1 | 2/2013 | Kitada et al. | |
| 2013/0044374 A1 | 2/2013 | Kitada et al. | |
| 2013/0045350 A1 | 2/2013 | Kitada et al. | |
| 2013/0288558 A1 | 10/2013 | Hirata et al. | |

FOREIGN PATENT DOCUMENTS

| | | | |
|---|---|---|---|
| CN | 201548779 U * | 8/2010 | |
| CN | 102411229 A | 4/2012 | |
| EP | 2 302 444 A1 | 3/2011 | |
| EP | 2 309 313 A1 | 4/2011 | |
| EP | 2 434 316 A1 | 3/2012 | |
| JP | 2004-250213 A | 9/2004 | |
| JP | 2005-37417 A | 2/2005 | |
| JP | 4307510 B1 | 8/2009 | |
| JP | 4406043 B2 | 1/2010 | |
| JP | 2010-030744 A | 2/2010 | |
| JP | 2011-2818 A | 1/2011 | |
| JP | 4676026 B1 | 4/2011 | |
| TW | I307431 A1 | 3/2009 | |
| TW | 201008726 A | 3/2010 | |
| WO | 2010/131677 A1 | 11/2010 | |
| WO | 2010/134441 A1 | 11/2010 | |
| WO | WO 2010131677 A1 * | 11/2010 | |

OTHER PUBLICATIONS

European Search Report dated Dec. 23, 2011, issued in corresponding European Patent Application No. 11157393.7.
Non-Final Office Action dated May 22, 2013, issued in corresponding U.S. Appl. No. 13/038,076.
U.S. Non-Final Office Action dated Nov. 29, 2013, issued in U.S. Appl. No. 13/038,076.
Korean Office Action dated May 25, 2011, issued in Korean Patent Application No. 10-2011-0005534, w/ partial English translation.
Taiwanese Office Action dated Jun. 28, 2011, issued in Taiwanese Patent Application No. 099135470, with English Translation.
European Search Report dated Jun. 28, 2011, issued in European Patent Application No. 11155519.9.
European Office Action dated Jun. 7, 2013, issued in European Patent Application No. 11 155 519.9 (5 pages).
US Office Action dated Dec. 30, 2011, issued in U.S. Appl. No. 13/022,977.
US Office Action dated Jun. 13, 2012, issued in U.S. Appl. No. 13/022,977.
US Office Action dated Oct. 3, 2012, issued in U.S. Appl. No. 13/022,977.
US Notice of Allowance dated Apr. 17, 2013, issued in U.S. Appl. No. 13/022,977.
Chinese Office Action dated Dec. 2, 2013, issued in related Chinese Application No. 201110166186.4 w/English Translation. (16 pages).
Chinese Office Action dated Dec. 17, 2013, issued in corresponding Chinese Application No. 201110162024.3 w/ English Translation. (14 pages).
Chinese Office Action dated May 27, 2014, issued in related Chinese Patent Application No. 201110162024.3, w/ English translation (10 pages).

* cited by examiner

SYSTEM FOR MANUFACTURING LIQUID CRYSTAL DISPLAY DEVICE

CROSS-REFERENCE OF RELATED APPLICATIONS

This application is a Divisional of application Ser. No. 13/038,076, filed Mar. 1, 2011, which claims priority of Japanese Patent Application Nos. 2010-222035 and 2010-246501, the contents of which are incorporated herein by reference.

BACKGROUND OF THE INVENTION

1. Field of the Invention

The invention relates to a system and a method for manufacturing a liquid crystal display device by bonding sheet pieces of optical functional films including polarizing films to both surfaces of a rectangular liquid crystal panel.

2. Description of the Related Art

A known example of a liquid crystal display device manufacturing system as mentioned above is configured to turn over a substrate 1 to which a piece 19A of a belt-shaped film 10A has been bonded and then to bond a piece 19B of another belt-shaped film 10B to the substrate 1 (see for example Japanese Patent Application Laid-Open (JP-A) No. 2005-37417, paragraphs [0037] to [0044] and FIGS. 6 to 9).

On the other hand, there has been a demand for a compact manufacturing line that can maintain a high level of bonding accuracy and performance even when rolls with different widths corresponding to the long and short sides of a rectangular liquid crystal panel are used in it. To meet such a demand, another proposal is made which includes rotating a liquid crystal panel by 90° so that a linear manufacturing line can be provided (see for example Japanese Patent No. 4307510).

PRIOR ART LITERATURE

Patent Document

Patent Document 1: Japanese Patent Application Laid-Open (JP-A) No. 2005-37417
Patent Document 2: Japanese Patent No. 4307510 Publication When a liquid crystal display device is manufactured by bonding optical functional films to both surfaces of a liquid crystal panel, a turning mechanism for turning over the liquid crystal panel and a rotation mechanism for rotating it may be provided so that each optical functional film can be bonded from only one of the upper side or the lower side and that a linear manufacturing line can be provided.

When the steps of turning over a liquid crystal panel and rotating it are each independently performed, the liquid crystal panel should be turned over about an axis parallel to the long or short side of the liquid crystal panel in order not to change the positional relationship between the long and short sides before and after the turnover. In this case, however, the weight of the liquid crystal panel is applied to only one of the long or short side of the liquid crystal panel during the turnover, so that the liquid crystal panel may crack or chip. In particular, as liquid crystal displays increasingly become wider, liquid crystal panels become more likely to crack or chip.

SUMMARY OF THE INVENTION

The invention has been made under the circumstances described above, and an object of the invention is to provide a system and a method for manufacturing a liquid crystal display device, which can put a liquid crystal panel into a turned over and rotated state in a more satisfactory manner. Another object of the invention is to provide a system and a method for manufacturing a liquid crystal display device, which can improve the accuracy with which optical functional films are bonded to a liquid crystal panel.

A system for manufacturing a liquid crystal display device according to the present invention relates to a system for manufacturing a liquid crystal display device by bonding sheet pieces of optical functional films comprising polarizing films to both surfaces of a rectangular liquid crystal panel, comprising:

a panel turning mechanism for turning over the liquid crystal panel after one of the sheet pieces of optical functional films is bonded to the liquid crystal panel and before another of the sheet pieces of optical functional films is bonded thereto, wherein the panel turning mechanism has: a long side-supporting part for supporting the liquid crystal panel by coming into contact with an end face along at least one long side of the liquid crystal panel; and a short side-supporting part for supporting the liquid crystal panel by coming into contact with an end face along at least one short side of the liquid crystal panel, and the panel turning mechanism turns over the liquid crystal panel about a single axis neither parallel to the long side of the liquid crystal panel nor to the short side of the liquid crystal panel in such a manner that the positional relationship between the long and short sides of the liquid crystal panel is reversed.

According to an embodiment of the invention, when the liquid crystal panel is turned over about a single axis not parallel to any of the long and short sides of the liquid crystal panel with both of the long and short sides being supported, the weight of the liquid crystal panel can be dispersed to both of the long and short sides for the reversal of the positional relationship between the long and short sides of the liquid crystal panel. Therefore, the liquid crystal panel is less likely to crack or chip, and the liquid crystal panel can be put into a turned over and rotated state in a more satisfactory manner.

In particular, the long and short sides of the liquid crystal panel can be aligned at the same time, because the long-side-end-face and short-side-end-face of the liquid crystal panel are brought into contact with the long side-supporting part and the short side-supporting part, respectively. Therefore, the directions of the long and short sides can be aligned with higher accuracy with respect to the feed direction of the liquid crystal panel, so that the optical functional films can be bonded to the liquid crystal panel with improved accuracy.

It is preferable that the long side-supporting part comes into contact with only an end face along one long side of the liquid crystal panel to support the liquid crystal panel, and the short side-supporting part comes into contact with only an end face along one short side of the liquid crystal panel to support the liquid crystal panel.

According to an embodiment of the invention, the liquid crystal panel can be successfully supported, not depending on the size of the liquid crystal panel. Specifically, a structure configured to support end faces along both long or short sides of a liquid crystal panel cannot support another liquid crystal panel of a size larger than the distance between the long side-supporting parts or the short side-supporting parts. In contrast, a structure configured to support only an end face along one long side and an end face along one short side according to an embodiment of the invention can successfully support even a larger size liquid crystal panel. Therefore, such a structure makes it possible to turn over different size liquid crystal panels in the same panel turning mechanism.

In addition, the structure configured to support end faces along both long or short sides of a liquid crystal panel may cause a force to act on the liquid crystal panel from the opposed long side-supporting parts or the opposed short side-supporting parts, so that an excessive load may be applied to the liquid crystal panel to cause cracking, chipping or bending of the liquid crystal panel. In contrast, the structure configured to support only an end face along one long side and an end face along one short side according to an embodiment of the invention can prevent such problems. This advantageous effect becomes more significant as the size of the liquid crystal panel increases.

In addition, when the liquid crystal panel is supported only at an end face along one long side and at an end face along one short side according to an embodiment of the invention, the long side-supporting part and the short side-supporting part only have to be in contact with these end faces, so that the time required to support the liquid crystal panel can be reduced as much as possible, which can increase the production efficiency. In contrast, the structure configured to support end faces along both long or short sides of a liquid crystal panel requires a process including bringing the long side-supporting part or the short side-supporting part into contact with one end face along one long or short side and then bringing the long side-supporting part or the short side-supporting part into contact with the other end face along the other long or short side, which increases the number of steps and the time required to support the liquid crystal panel.

It is preferable that the long side-supporting part comes into contact with only an end face along a long side of the liquid crystal panel to support the liquid crystal panel, wherein the long side is closer to the single axis, and the short side-supporting part comes into contact with only an end face along a short side of the liquid crystal panel to support the liquid crystal panel, wherein the short side is closer to the single axis.

According to an embodiment of the invention, the liquid crystal panel can be turned over while the liquid crystal panel is supported at an end face along one long side and at an end face along one short side by the long side-supporting part and the short side-supporting part, respectively, from the lower side, so that the liquid crystal panel is prevented from interfering with the liquid crystal panel-feeding line.

It is preferable that the panel turning mechanism has a both surface-contact part for coming into contact with at least part of both surfaces of the liquid crystal panel.

According to an embodiment of the invention, the liquid crystal panel can be successfully held and stably turned over with the both surface-contact part being in contact with both surfaces of the liquid crystal panel.

It is preferable that the panel turning mechanism turns over the liquid crystal panel about an axis inclined by 45° from a direction of feeding of the liquid crystal panel to a direction parallel to the surface of the liquid crystal panel.

According to an embodiment of the invention, the positional relationship between the long and short sides of the liquid crystal panel can be easily reversed only by turning over the liquid crystal panel about the axis inclined by 45°.

The system can be for manufacturing the liquid crystal display device by a process comprising feeding optical functional films from first and second continuous rolls with different widths, respectively, which are each formed by winding, into a roll, a long optical functional film comprising a polarizing film, transversely cutting the optical functional films to form sheet pieces of the optical functional films, and bonding the sheet pieces to both surfaces of the rectangular liquid crystal panel.

The system can be for manufacturing the liquid crystal display device by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of the rectangular liquid crystal panel.

A method for manufacturing a liquid crystal display device according to the present invention relates to a method for manufacturing a liquid crystal display device by bonding sheet pieces of optical functional films comprising polarizing films to both surfaces of a rectangular liquid crystal panel, comprising:

a panel turning step comprising turning over the liquid crystal panel after one of the sheet pieces of optical functional films is bonded to the liquid crystal panel and before another of the sheet pieces of optical functional films is bonded thereto, wherein in the panel turning step, the liquid crystal panel is turned over about a single axis neither parallel to a long side of the liquid crystal panel nor to a short side of the liquid crystal panel in such a manner that the positional relationship between the long and short sides of the liquid crystal panel is reversed using a panel turning mechanism comprising: a long side-supporting part for supporting the liquid crystal panel by coming into contact with an end face along at least one long side of the liquid crystal panel; and a short side-supporting part for supporting the liquid crystal panel by coming into contact with an end face along at least one short side of the liquid crystal panel.

It is preferable that the long side-supporting part comes into contact with only an end face along one long side of the liquid crystal panel to support the liquid crystal panel, and the short side-supporting part comes into contact with only an end face along one short side of the liquid crystal panel to support the liquid crystal panel.

It is preferable that the long side-supporting part comes into contact with only an end face along a long side of the liquid crystal panel to support the liquid crystal panel, wherein the long side is closer to the single axis, and the short side-supporting part comes into contact with only an end face along a short side of the liquid crystal panel to support the liquid crystal panel, wherein the short side is closer to the single axis.

It is preferable that the panel turning mechanism has a both surface-contact part for coming into contact with at least part of both surfaces of the liquid crystal panel.

It is preferable that, in the panel turning step, the liquid crystal panel is turned over about an axis inclined by 45° from a direction of feeding of the liquid crystal panel to a direction parallel to the surface of the liquid crystal panel.

The method can be for manufacturing the liquid crystal display device by a process comprising feeding optical functional films from first and second continuous rolls with different widths, respectively, which are each formed by winding, into a roll, a long optical functional film comprising a polarizing film, transversely cutting the optical functional films to form sheet pieces of the optical functional films, and bonding the sheet pieces to both surfaces of the rectangular liquid crystal panel.

The method can be for manufacturing the liquid crystal display device by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of the rectangular liquid crystal panel.

DETAILED DESCRIPTION OF THE PREFERRED EMBODIMENTS

Figure 1:
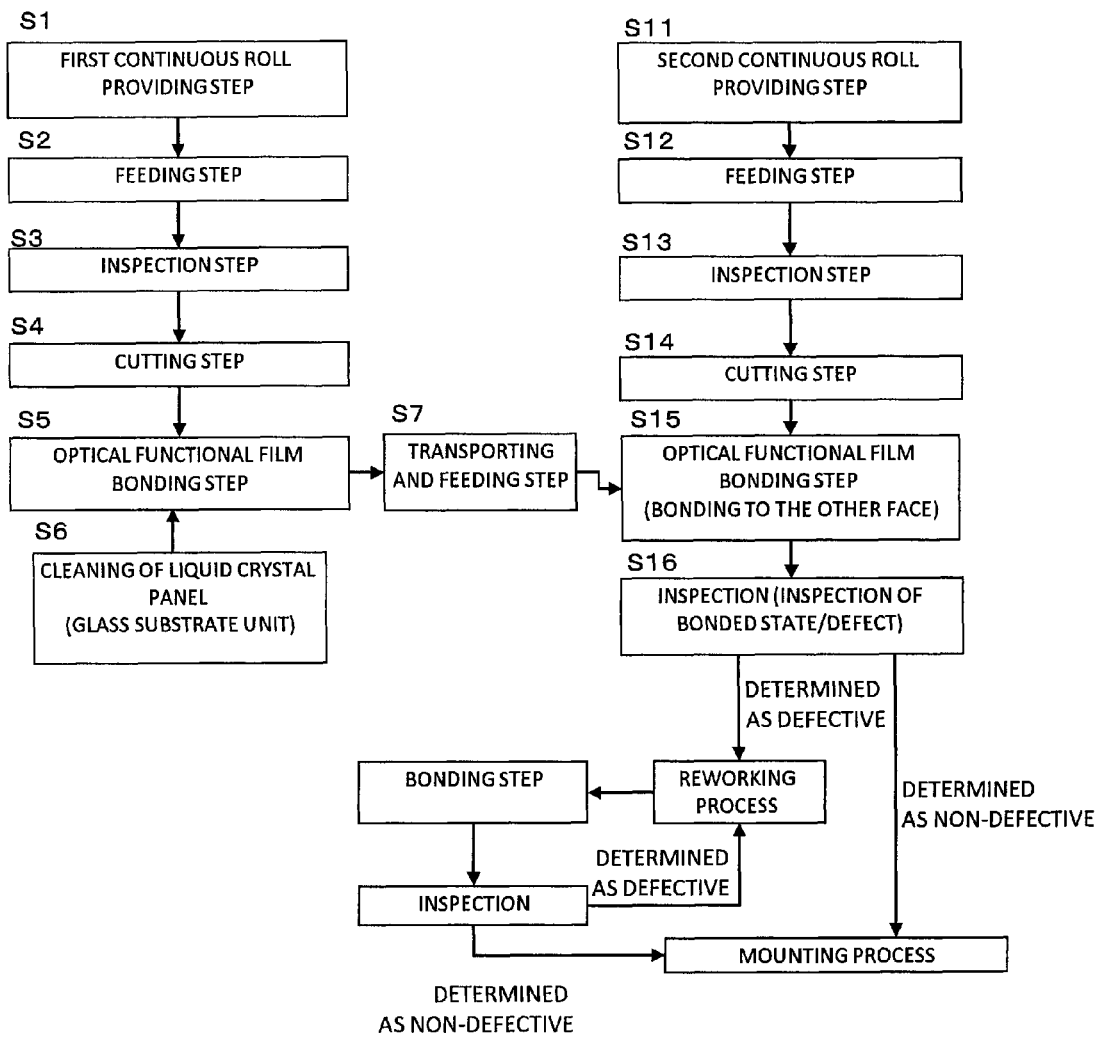
FIG. 1 is a flow chart showing an example of the liquid crystal display device manufacturing method according to an embodiment of the invention.
Figure 2:
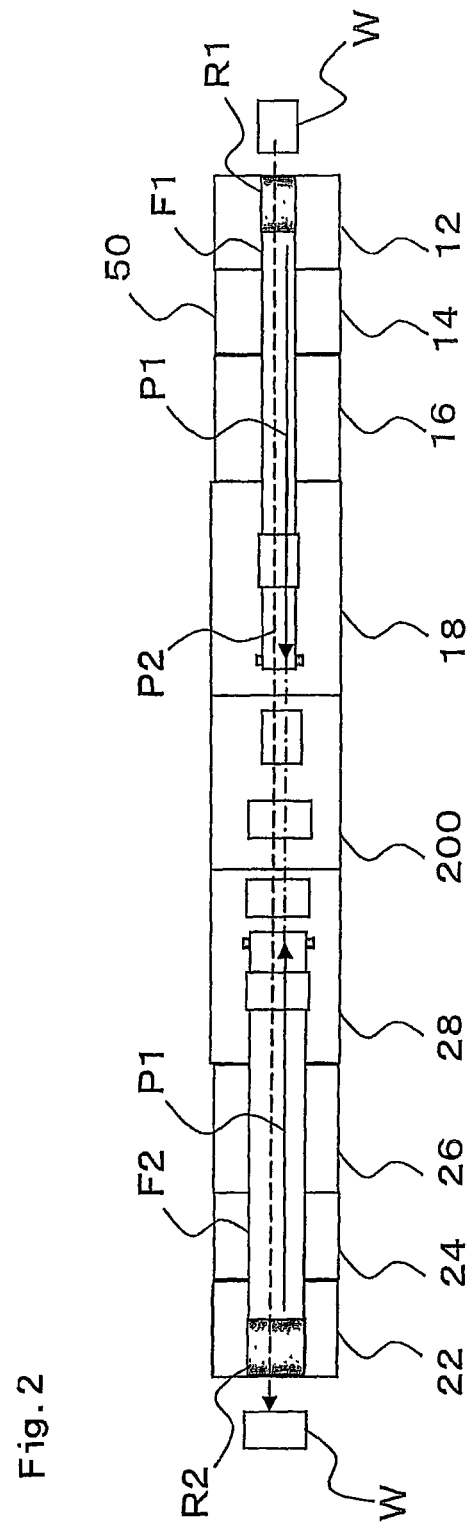
FIG. 2 is a schematic plan view showing an example of the liquid crystal display device manufacturing system.
Figure 3:
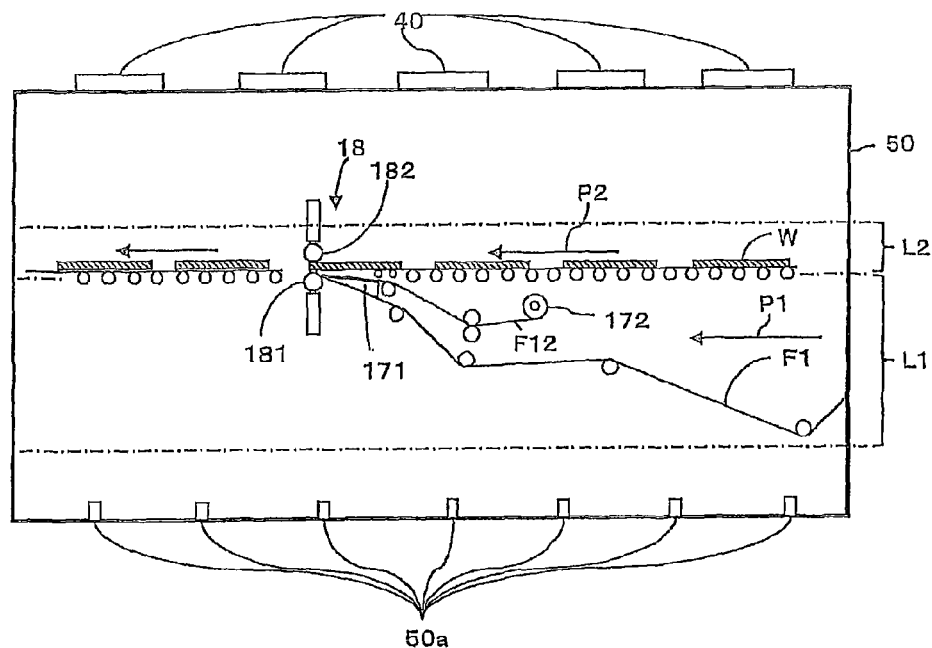
FIG. 3 is a schematic side view showing a process of bonding a first optical functional film to a liquid crystal panel.
Figure 4:
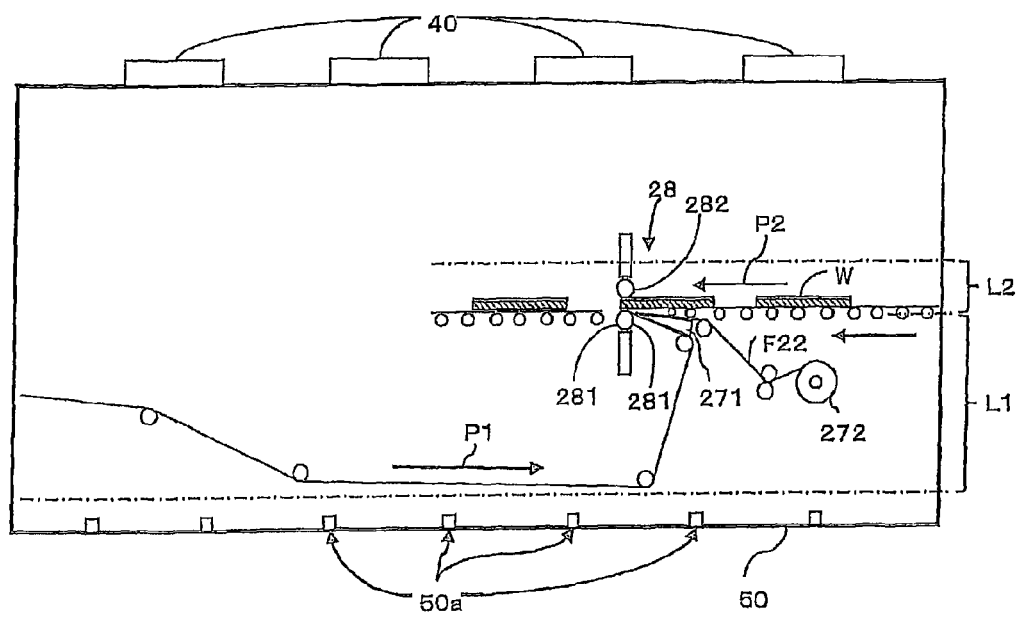
FIG. 4 is a schematic side view showing a process of bonding a second optical functional film to the liquid crystal panel.

FIG. 1 is a flow chart showing an example of the liquid crystal display device manufacturing method according to an embodiment of the invention. FIG. 2 is a schematic plan view showing an example of the liquid crystal display device manufacturing system. FIG. 3 is a schematic side view showing a process of bonding a first optical functional film F11 to a liquid crystal panel W. FIG. 4 is a schematic side view showing a process of bonding a second optical functional film F21 to the liquid crystal panel W.

Liquid Crystal Panel

The liquid crystal panel W for use in the liquid crystal display device manufactured according to the invention is typically a glass substrate unit including a pair of glass substrates and a liquid crystal placed therebetween. The liquid crystal panel W has a rectangular shape.

Optical Functional Film

The optical functional film for use in the liquid crystal display device manufactured according to the invention includes a polarizing film. A pressure-sensitive adhesive layer is formed on one side of the optical functional film so that it can be bonded to the liquid crystal panel W, and a carrier film for protecting the pressure-sensitive adhesive layer is also provided thereon. Namely, the optical functional film, the pressure-sensitive adhesive layer, and the carrier film are stacked in this order. A surface protecting film is provided on the other side of the optical functional film with a pressure-sensitive adhesive layer interposed therebetween. Hereinafter, the laminate of the surface protecting film, the optical functional film, and the carrier film is also referred to as an optical film laminate.

Figure 5:
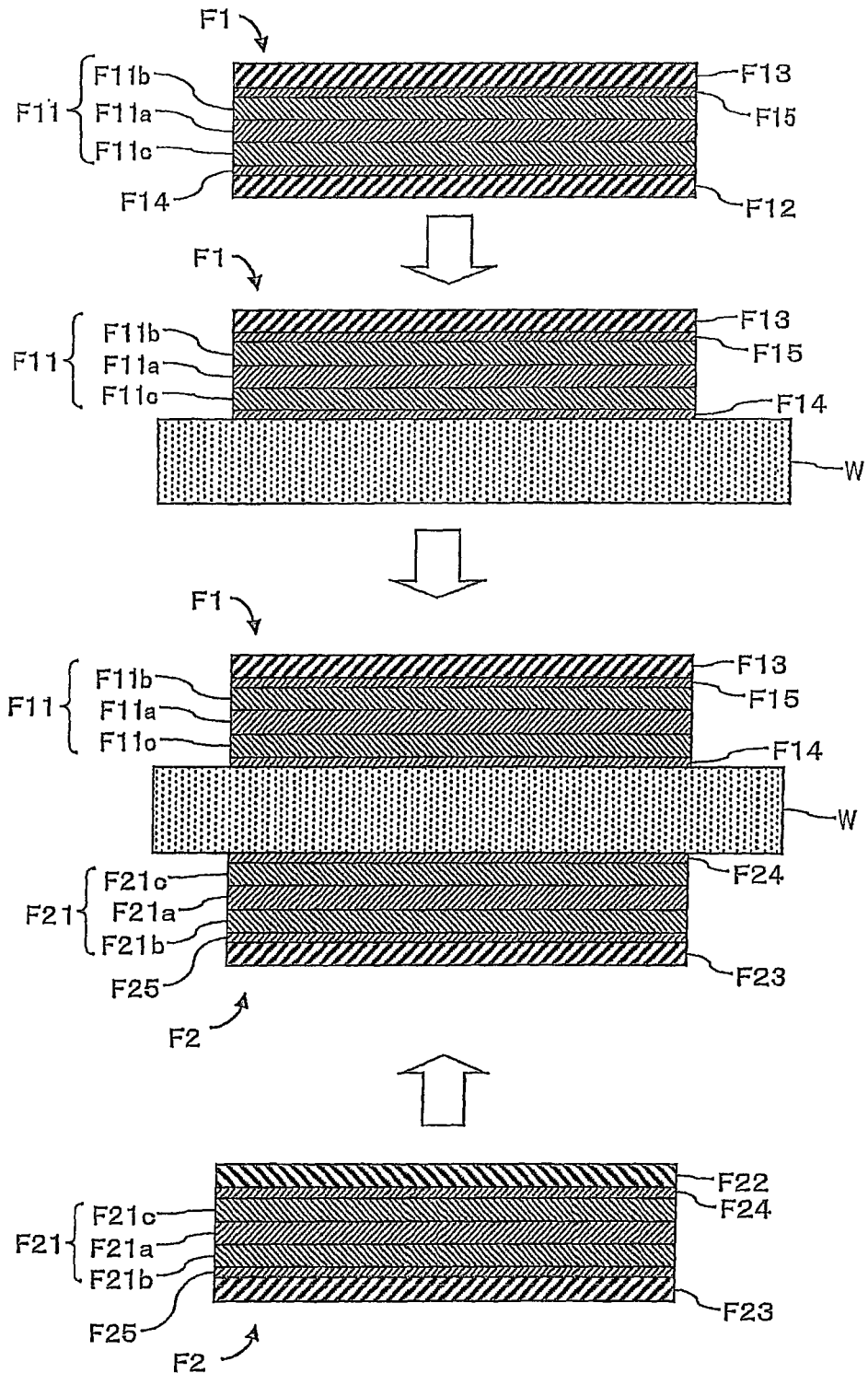
FIG. 5 is a cross-sectional view showing an example of the process of bonding optical functional films to a liquid crystal panel.

FIG. 5 is a cross-sectional view showing an example of the process of bonding the optical functional film to the liquid crystal panel W. In this embodiment, first and second optical film laminates F1 and F2 are used. The first optical film laminate F1 is to be bonded to one surface of the liquid crystal panel W and includes a first optical functional film F11, and the second optical film laminate F2 is to be bonded to the other surface of the liquid crystal panel W and includes a second optical functional film F21.

The first optical film laminate F1 has a structure in which the first optical functional film F11, a first carrier film F12 and a surface protecting film F13 are stacked. In this embodiment, the first optical functional film F11 includes a polarizing film. The first optical functional film F11 includes a first polarizer F11a, a first film F11b bonded to one side thereof with an adhesive layer (not shown) interposed therebetween, and a second film F11c bonded to the other side thereof with an adhesive layer (not shown) interposed therebetween. The first polarizer F11a is typically formed by stretching a polyvinyl alcohol (PVA) film. It will be understood that the first polarizer F11a may be formed using any other film than the polyvinyl alcohol film.

The first and second films F11b and F11c are each typically a protective film (such as a triacetylcellulose film or a PET film). The second film F11c will be bonded to the liquid crystal panel W with a first pressure-sensitive adhesive layer F14 interposed therebetween. The first film F11b may be subjected to a surface treatment. For example, the surface treatment may be a hard coating treatment, an antireflection treatment, or a treatment for any other purpose such as an anti-sticking, diffusion, or antiglare purpose. The first carrier film F12 is bonded to the second film F11c with the first pressure-sensitive adhesive layer F14 interposed therebetween. The surface protecting film F13 is bonded to the first film F11b with a pressure-sensitive adhesive layer F15 interposed therebetween.

The laminated structure of the second optical film laminate F2 is the same as, but not limited to, that of the first optical film laminate F1. The second optical film laminate F2 has a structure in which a second optical functional film F21, a second carrier film F22, and a surface protecting film F23 are stacked. In this embodiment, the second optical functional film F21 includes a polarizing film. The second optical functional film F21 includes a second polarizer F21a, a third film F21b bonded to one side thereof with an adhesive layer (not shown) interposed therebetween, and a fourth film F21c bonded to the other side thereof with an adhesive layer (not shown) interposed therebetween. The second polarizer F21a is typically formed by drying a polyvinyl alcohol (PVA) film. It will be understood that the second polarizer F21a may be formed using any other film than the polyvinyl alcohol film.

The third and fourth films F21b and F21c are each typically a protective film (such as a triacetylcellulose film or a PET film). The fourth film F21c will be bonded to the liquid crystal panel W with a second pressure-sensitive adhesive layer F24 interposed therebetween. The third film F21b may be subjected to a surface treatment. For example, the surface treatment may be a hard coating treatment, an antireflection treatment, or a treatment for any other purpose such as an anti-sticking, diffusion, or antiglare purpose. The second carrier film F22 is bonded to the fourth film F21c with the second pressure-sensitive adhesive layer F24 interposed therebetween. The surface protecting film F23 is bonded to the third film F21b with a pressure-sensitive adhesive layer F25 interposed therebetween.

Manufacturing Flow Chart (1) Step of Providing First Continuous Roll (S1 in FIG. 1). A first continuous roll R1 is provided which is formed by winding a first long optical film laminate F1 into a roll. The first continuous roll R1 has a width depending on the size of the liquid crystal panel W to be bonded. Specifically, the first continuous roll R1 is formed by winding, into a roll, a first optical film laminate F1 including a first optical functional film F11 with a width corresponding to the short or long side of the liquid crystal panel W. More specifically, the first continuous roll R1 is formed by winding, into a roll, the first long optical film laminate F1 that is obtained by slitting, into a width corresponding to the short or long side of the liquid crystal panel W, a long material including the first optical functional film F11, the first pressure-sensitive adhesive layer F14, and the first carrier film F12 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the first optical film laminate F1 formed can have an absorption axis extending along the longitudinal direction with high accuracy. In this embodiment, the first continuous roll R1 used has a width corresponding to the short side of the liquid crystal panel W.

(2) Step of Feeding First Optical Functional Film (S2 in FIG. 1). A first feeder 12 draws and feeds the first optical film laminate F1 including the first optical functional film F11 to the downstream side from the first continuous roll R1 provided and placed. The first optical film laminate F1 is fed from the first continuous roll R1 linearly in planar view.

(3) First Inspection Step (S3 in FIG. 1). The first optical film laminate F1 is inspected for defects using a first defect inspection apparatus 14. In this step, the defect inspection method may be a method of performing imaging and image processing on both sides of the first optical film laminate F1 with transmitted light or reflected light, a method of performing imaging and image processing with a polarizing film for inspection arranged in a crossed Nicols relationship (also referred to as "0° cross") with the absorption axis of the polarizing film (the object to be inspected) between a CCD camera and the object, or a method of performing imaging and image processing with a polarizing film for inspection arranged at a certain angle (for example, in the range of more than 0° to 10°, also referred to as "X° cross") with the absorption axis of the polarizing film (the object to be inspected) between a CCD camera and the object. For example, gray-scale determination based on binarization may be used in the image processing algorithm to detect defects.

Defect information detected by the first defect inspection apparatus 14 is associated with the positional information (such as position coordinates) and sent to a controller so that it can contribute to the cutting process with a first cutting apparatus 16.

(4) First Cutting Step (S4 in FIG. 1). The first cutting apparatus 16 cuts, in the transverse direction, at least the first optical functional film F11 of the first optical film laminate F1 drawn from the first continuous roll R1, so that a sheet piece of the first optical functional film F11 is formed. In this example, while the first carrier film F12 is left uncut, the first optical functional film F11, to which the first carrier film F12 is attached, and the surface protecting film F13, to which the first optical functional film F11 is attached, are cut into a predetermined size. It will be understood that such a process is non-limiting, and alternatively, for example, the first optical film laminate F1 may be cut completely so that a piece of the first optical film laminate F1 can be formed. For example, the cutting means may be a laser, a cutter, or the like. The cutting is preferably performed based on the defect information detected by the first defect inspection apparatus 14 so that defects can be avoided. This significantly increases the first optical film laminate F1 yield. Defective parts of the first optical film laminate F1 are removed by a first removing apparatus (not shown) so as not to be bonded to the liquid crystal panel W. In this embodiment, the first optical functional film F11 is cut into a length corresponding to the long side of the liquid crystal panel W. Alternatively, however, it may be cut into a length corresponding to the short side of the liquid crystal panel W when the first continuous roll R1 has a width corresponding to the long side of the liquid crystal panel W.

All of the step of providing the first continuous roll, the first inspection step, and the first cutting step are preferably performed in a continuous manufacturing line. In the above series of manufacturing steps, a sheet piece of the first optical functional film F11 is formed, which is to be bonded to one surface of the liquid crystal panel W. A description is given below of a process of forming a sheet piece of the second optical functional film F21 to be bonded to the other surface of the liquid crystal panel W.

(5) Step of Providing Second Continuous Roll (S11 in FIG. 1). A second continuous roll R2 is provided which is formed by winding a second long optical film laminate F2 into a roll. The second continuous roll R2 has a width depending on the size of the liquid crystal panel W to be bonded. Specifically, the second continuous roll R2 is formed by winding, into a roll, a second optical film laminate F2 including a second optical functional film F21 with a width corresponding to the long or short side of the liquid crystal panel W. More specifically, the second continuous roll R2 is formed by winding, into a roll, the second long optical film laminate F2 that is obtained by slitting, into a width corresponding to the long or short side of the liquid crystal panel W, a long material including the second optical functional film F21, the second pressure-sensitive adhesive layer F24, and the second carrier film F22 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the second optical film laminate F2 formed can have an absorption axis extending along the longitudinal direction with high accuracy. The second continuous roll R2 is typically formed with a width different from that of the first continuous roll R1. Specifically, when the first continuous roll R1 is formed with a width corresponding to the long side of the liquid crystal panel W, the second continuous roll R2 is formed with a width corresponding to the short side of the liquid crystal panel W, and when the first continuous roll R1 is formed with a width corresponding to the short side of the liquid crystal panel W, the second continuous roll R2 is formed with a width corresponding to the long side of the liquid crystal panel W. In this embodiment, the second continuous roll R2 used has a width corresponding to the long side of the liquid crystal panel W. As used herein, the expression "corresponding to the long or short side of the liquid crystal panel W" means that the bonding length of the optical functional film F11 or F21 (exclusive of the length of the exposed portion) will correspond to the length of the long or short side of the liquid crystal panel W and does not mean that the width of the optical functional film F11 or F21 has to be equal to the length of the long or short side of the liquid crystal panel W.

(6) Step of Feeding Second Optical Functional Film (S12 in FIG. 1). A second feeder 22 draws and feeds the second optical film laminate F2 including the second optical functional film F21 to the downstream side from the second continuous roll R2 provided and placed. The second optical film laminate F2 is fed from the second continuous roll R2 linearly in planar view. More specifically, as shown in FIG. 2, the first and second optical film laminates F1 and F2 are fed from the first and second continuous rolls R1 and R2, respectively, on first linear feed paths P1 whose extended lines overlap each other in planar view (the film feeding step). The first and second optical film laminates F1 and F2 may be fed in directions opposite to each other or in the same direction on the first linear feed paths P1. In this embodiment, the liquid crystal display device manufacturing system includes film feeding lines L1 that are arranged so that the first and second optical film laminates F1 and F2 being fed can be linearly aligned with each other in planar view as described above (see FIGS. 3 and 4).

(7) Second Inspection Step (S13 in FIG. 1). The second optical film laminate F2 is inspected for defects using a second defect inspection apparatus 24. In this step, the defect inspection method is the same as the above method with the first defect inspection apparatus 14. However, the first inspection step (S3) and the second inspection step (S13) may be omitted. In such a case, the first and second optical film laminates F1 and F2 may be inspected for defects at a stage where the first and second continuous rolls R1 and R2 are manufactured, and liquid crystal display devices may be manufactured using the first and second continuous rolls R1 and R2 to which the defect information detected by the defect inspection has been attached.

(8) Second Cutting Step (S14 in FIG. 1). A second cutting apparatus 26 cuts, in the transverse direction, at least the second optical functional film F21 of the second optical film laminate F2 drawn from the second continuous roll R2, so that a sheet piece of the second optical functional film F21 is formed. In this example, while the second carrier film F22 is left uncut, the second optical functional film F21, to which the second carrier film F22 is attached, and the surface protecting film F23, to which the second optical functional film F21 is attached, are cut into a predetermined size. It will be understood that such a process is non-limiting, and alternatively, for example, the second optical film laminate F2 may be cut completely so that a piece of the second optical film laminate F2 can be formed. For example, the cutting means may be a laser, a cutter, or the like. The cutting is preferably performed based on the defect information detected by the second defect inspection apparatus 24 so that defects can be avoided. This significantly increases the second optical film laminate F2 yield. Defective parts of the second optical film laminate F2 are removed by a second removing apparatus (not shown) so as not to be bonded to the liquid crystal panel W. In this embodiment, the second optical functional film F21 is cut into a length corresponding to the short side of the liquid crystal panel W. Alternatively, however, it may be cut into a length corresponding to the long side of the liquid crystal panel W when the second continuous roll R2 has a width corresponding to the short side of the liquid crystal panel W.

The step of feeding the liquid crystal panel W is performed in parallel with the step of forming sheet pieces of the first and second optical functional films F11 and F21, respectively. The liquid crystal panel W is subjected to the process described below while it is fed.

(9) Cleaning Step (S6 in FIG. 1). The surface of the liquid crystal panel W is cleaned by polishing cleaning, washing with water, or any other cleaning method. As shown in FIGS. 3 and 4, the liquid crystal panel W having undergone cleaning is fed on a second linear feed path P2 in a panel feeding line L2 that is placed above the film feeding lines L1 in an overlapping manner, and is placed to feed the liquid crystal panels W linearly in planar view (the panel feeding step). The second linear feed path P2 extends at least between first and second bonding apparatuses 18 and 28 and placed parallel to the first linear feed paths P1 so as to at least partially overlap with the first linear feed paths P1 in planar view (see FIG. 2).

(10) Step of Bonding First Optical Functional Film (S5 in FIG. 1). The cut piece of the first optical functional film F11 (the sheet piece of the first optical functional film F11) is bonded to one surface of the liquid crystal panel W with the pressure-sensitive adhesive layer F14 interposed therebetween by the first bonding apparatus 18, while the first carrier film F12 is peeled off. The first carrier film F12 peeled off by a peeling unit 171 is wound onto a roll 172. In the bonding, the first optical functional film F11 and the liquid crystal panel W are inserted and press-bonded between a pair of rollers 181 and 182 opposed to each other.

(11) Step of Transporting and Feeing Panel (S7 in FIG. 1). The liquid crystal panel W to which the sheet piece of the first optical functional film F11 has been bonded by the first bonding apparatus 18 is fed to a second bonding apparatus 28 along the second linear feed path P2. The panel feeding line L2 is provided with a panel turning mechanism 200 for turning over the liquid crystal panel W after the sheet piece of the first optical functional film F11 is bonded thereto and before a sheet piece of the second optical functional film F21 is bonded thereto. The panel turning mechanism 200 turns over the liquid crystal panel W so that the positional relationship between the long and short sides of the liquid crystal panel W can be reversed (the step of turning over the panel). Specifically, the long side of the liquid crystal panel W after the turnover is parallel to the short side before the turnover, and the short side of the liquid crystal panel W after the turnover is parallel to the long side before the turnover. The panel turning mechanism 200 puts the liquid crystal panel W into a turned over state and into a horizontally rotated state by 90° to allow the first and second optical functional films F11 and F21 to be bonded in a crossed Nicols relationship (in such a relationship that the absorption axes of the polarizing films are perpendicular to each other) to the liquid crystal panel W.

In the embodiment described above, the liquid crystal panel W is turned over after the first optical functional film F11 is bonded thereto in the first bonding apparatus 18. Alternatively, however, the second optical functional film F21 may be bonded to the liquid crystal panel W before the first optical functional film F11 is bonded thereto as mentioned above. In such a case, the liquid crystal panel W may be turned over after the second optical functional film F21 is bonded thereto in the second bonding apparatus 28.

(12) Step of Bonding Second Optical Functional Film (S15 in FIG. 1). The cut piece of the second optical functional film F21 (the sheet piece of the second optical functional film F21) is bonded to the other surface of the liquid crystal panel W with the pressure-sensitive adhesive layer F24 interposed therebetween by the second bonding apparatus 28, while the second carrier film F22 is peeled off. The second carrier film F22 peeled off by a peeling unit 271 is wound onto a take-up roll 272. In the bonding, the second optical functional film F21 and the liquid crystal panel W are inserted and press-bonded between a pair of rollers 281 and 282 opposed to each other.

(13) Step of Inspecting Liquid Crystal Panel (S16 in FIG. 1). The liquid crystal panel W with both surfaces bonded to the optical functional films F11 and F21 is inspected using an inspection apparatus. An example of the inspection method is a method of performing imaging and image processing on both sides of the liquid crystal panel W with transmitted light and reflected light. Another example of the method uses a polarizing film for inspection placed between a CCD camera and the object to be inspected. For example, gray-scale determination based on binarization may be used in the image processing algorithm to detect defects.

(14) Defect information detected by the inspection apparatus is used to determine whether the liquid crystal panel W is non-defective. The liquid crystal panel W determined to be non-defective is transferred to the next implementing step. When determined to be defective, it is subjected to a reworking process, in which a new optical functional film F11 or F21 is bonded, and then the product is inspected. The product determined to be non-defective is transferred to the implementing step, but the product determined to be defective is subjected to the reworking process again or to disposal.

In the above series of manufacturing steps, the first optical functional film F11 bonding step and the second optical functional film F21 bonding step may be performed in a continuous manufacturing line, which makes it possible to manufacture the liquid crystal display device in a satisfactory manner.

A description has been given of a method that includes leaving the carrier films F12 and F22 uncut and cutting other components of the optical film laminates F1 and F2 (half-cutting method). However, such a method is non-limiting, and alternatively, for example, continuous rolls having undergone half-cutting may be used, in which sheet pieces of the optical functional films F11 and F21 formed by previously cutting the other components of the optical film laminates F12 and F22 than the carrier films F12 and F22 are held on the carrier films F12 and F22, respectively. In this case, the continuous rolls may be formed by a process that includes slitting a long material into a width corresponding to the short or long side of the rectangular liquid crystal panel W, cutting the optical functional films F11 and F21 and the pressure-sensitive adhesive layers F14 and F24 of the resulting long optical film laminates F1 and F2, respectively, into a length corresponding to the long or short side of the liquid crystal panel W, while leaving the carrier films F12 and F22 uncut, and winding, into rolls, the laminates F1 and F2 having undergone the cutting, respectively. The optical film laminates F1 and F2 are drawn from such continuous rolls, respectively, and the sheet pieces of the optical functional films F11 and F21 are bonded to the surfaces of the liquid crystal panel W with the pressure-sensitive adhesive layers F14 and F24 interposed therebetween, respectively, while the carrier films F12 and F22 are peeled off, so that a liquid crystal display device is manufactured. The optical functional films F11 and F21 do not always have to be bonded after they are cut, and the cutting may be performed during or after the bonding.

In this embodiment, a partition structure 50 is provided, and air circulation apparatuses 40 for circulating air in the partition structure 50 are provided at the top of the partition structure 50. In this embodiment, the air circulation apparatuses 40 blow air into the partition structure 50, and the blown air is allowed to flow from the upper side to the lower side in the partition structure 50 and discharged from openings 50a formed at the bottom of the partition structure 50. Thus, the air is circulated in the partition structure 50 to keep the inside of the partition structure 50 clean.

Figure 6:
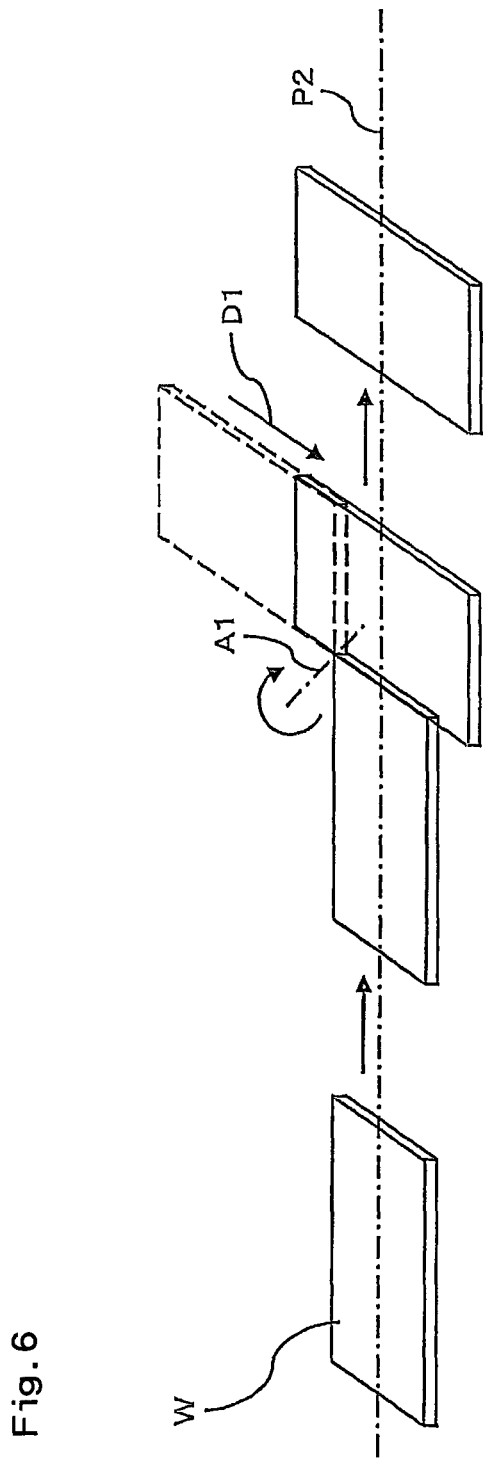
FIG. 6 is a schematic perspective view showing an example of the method of turning over a liquid crystal panel using a panel turning mechanism.
Figure 7:
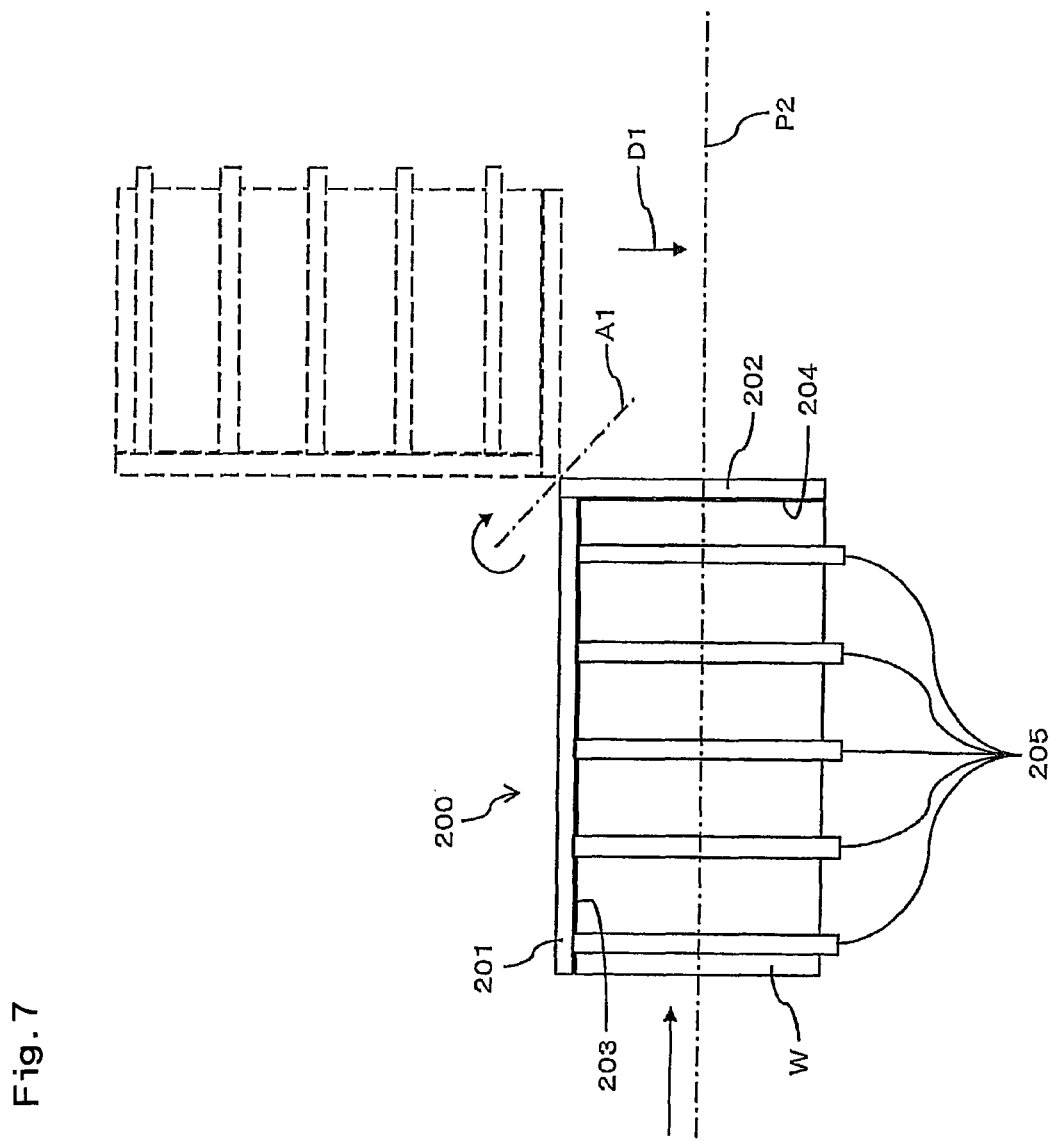
FIG. 7 is a schematic plan view showing an example of the panel turning mechanism.

FIG. 6 is a schematic perspective view showing an example of the method of turning over the liquid crystal panel W using the panel turning mechanism 200. FIG. 7 is a schematic plan view showing an example of the panel turning mechanism 200. It will be understood that the structure of the panel turning mechanism 200 is not limited to that shown in FIG. 7 and, any of various other structures may be used to form the panel turning mechanism 200.

In this embodiment, the liquid crystal panel W is turned over about a single axis A1 that is not parallel to any of the long and short sides of the liquid crystal panel W. The axis A1 is inclined by 45° from the direction of feeding of the liquid crystal panel W along the second linear feed path P2 to the direction parallel to the surface of the liquid crystal panel W.

As shown in FIG. 7, for example, the panel turning mechanism 200 has a long side-supporting part 201 for supporting at least one long side of the liquid crystal panel W and a short side-supporting part 202 for supporting at least one short side of the liquid crystal panel W. In this embodiment, the long side-supporting part 201 is configured to support only one long side of the liquid crystal panel W, and the long side-supporting part 201 is formed with a long-side-end-face contact part 203 to be in contact with the end face of the liquid crystal panel W along its long side. In this embodiment, the short side-supporting part 202 is configured to support only one short side of the liquid crystal panel W, and the short side-supporting part 202 is formed with a short-side-end-face contact part 204 to be in contact with the end face of the liquid crystal panel W along its short side. It will be appreciated that the long side-supporting part 201 may be configured to support both long sides of the liquid crystal panel W or the short side-supporting part 202 may be configured to support both short sides of the liquid crystal panel W.

According to this embodiment, when the liquid crystal panel W is turned over about the axis A1 not parallel to any of the long and short sides of the liquid crystal panel W with both of the long and short sides of the liquid crystal panel W being supported, the weight of the liquid crystal panel W can be dispersed to both of the long and short sides of the liquid crystal panel W for the reversal of the positional relationship between the long and short sides of the liquid crystal panel W. Therefore, the liquid crystal panel W is less likely to suffer from cracking or chipping, and the liquid crystal panel W can be put into a turned over and rotated state in a more satisfactory manner.

Particularly in this embodiment, the long and short sides of the liquid crystal panel W can be aligned at the same time, because the long-side-end-face and short-side-end-face of the liquid crystal panel W are brought into contact with the long-side-end-face contact part 203 and the short-side-end-face contact part 204, respectively. Therefore, even if the long and short sides of the liquid crystal panel W being transported are misaligned, the long-side-end-face and short-side-end-face of the liquid crystal panel W can be aligned by bringing them into contact with the long-side-end-face and short-side-end-face contact parts 203 and 204, respectively. Thus, the directions of the long and short sides of the liquid crystal panel W can be aligned with higher accuracy with respect to the feed direction, so that the optical functional films F11 and F21 can be bonded to the liquid crystal panel W with improved accuracy.

As shown in the example in FIG. 7, the panel turning mechanism 200 preferably has both side-contact parts 205 to be in contact with at least part of both sides of the liquid crystal panel W. According to this feature, the liquid crystal panel W can be held in a favorable manner with both sides thereof being in contact with the both side-contact part 205 and turned over in a stable manner. In this example, a plurality of both side-contact parts 205 are formed to extend parallel to one another on both one and the other surface sides of the liquid crystal panel W so that part of each surface can be in contact with the both side-contact part 205. It will be understood that such a structure is non-limiting and any of various other structures may be used for the both side-contact part 205. For example, the both side-contact part 205 may be configured to be in contact with the whole of at least one surface of the liquid crystal panel W.

In the example shown in FIG. 6, the liquid crystal panel W is turned over about an axis A1 passing through a corner portion of the liquid crystal panel W. For example, the axis A1 is defined to pass through the corner portion located on a downstream side with respect to the feed direction of the liquid crystal panel W. According to this feature, in the feed direction, the center of the liquid crystal panel W after the turnover is located downstream of the center of the liquid crystal panel W before the turnover, and the liquid crystal panel W does not go back when turned over. The corner portion is intended to include not only a corner (vertex) of the liquid crystal panel W but also an area ranging within a predetermined distance from the corner.

When the liquid crystal panel W is turned over by such a method, the liquid crystal penal W is positioned out of the second linear feed path P2 as shown by the broken lines in FIG. 6 after the turnover. Therefore, as indicated by the arrow D1 in FIG. 6, the liquid crystal panel W is preferably transferred onto the second linear feed path P2 after the turnover. According to this feature, a linear feed path can be formed for the liquid crystal panel W so that a compact manufacturing line can be formed. Alternatively, after the turnover, the liquid crystal panel W may be fed parallel to the second linear feed path P2 without being returned onto the second linear feed path P2. In this case, since there is no need to return the liquid crystal panel W to the second linear feed path P2, the tact time can be reduced correspondingly.

In this example, the liquid crystal panel W is turned over about the axis A1 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A1 inclined by 45° with respect to the feed direction. This allows further simplification of the apparatus and a further reduction in the tact time.

Also when the liquid crystal panel W is turned over about the axis A1 passing through a corner portion of the liquid crystal panel W, the liquid crystal panel W can be prevented from interfering with the liquid crystal panel W-feeding line (such as a feeding mechanism including components of the panel feeding line L2, such as rollers) during the turnover of the liquid crystal panel W. Therefore, since there is no need to vertically change the level of the liquid crystal panel W before and after the turnover, the tact time can be reduced correspondingly.

Figure 8:
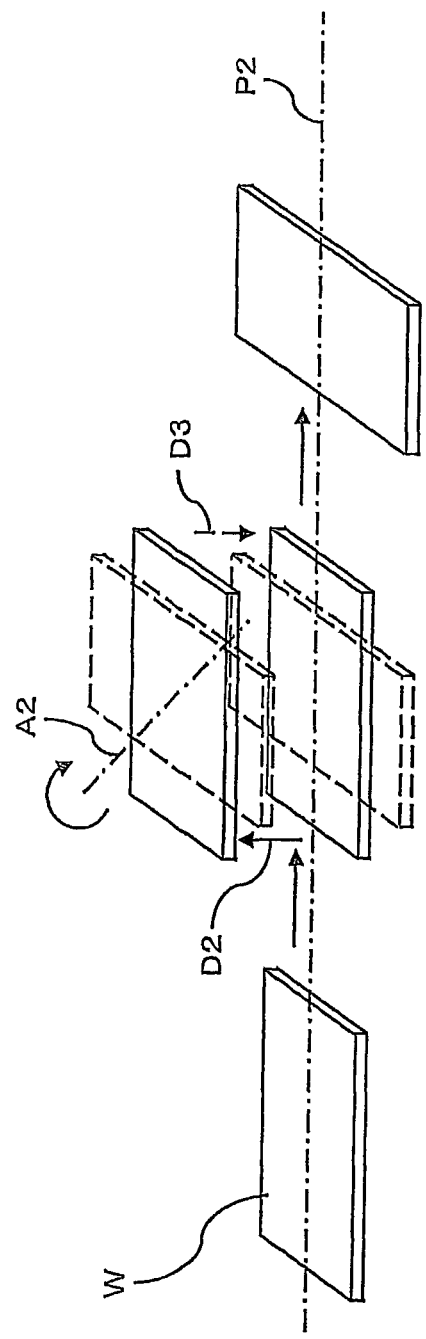
FIG. 8 is a schematic perspective view showing another example of the method of turning over a liquid crystal panel using a panel turning mechanism.

FIG. 8 is a schematic perspective view showing another example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A2 not parallel to any of the long and short sides of the liquid crystal panel W. The axis A2 is inclined by 45° from the direction of feeding of the liquid crystal panel W along the second linear feed path P2 to the direction parallel to the surface of the liquid crystal panel W.

In the example shown in FIG. 8, the liquid crystal panel W is turned over about the axis A2 passing through the central portion of the liquid crystal panel W. The axis A2 preferably passes through the center (the point of intersection of the two diagonal lines) of the liquid crystal panel W, but may pass through a position deviating by a predetermined distance from the center. In this example, the axis A2 passes through the central portion of the liquid crystal panel W, and therefore, as indicated by the broken lines in FIG. 8, the position of the liquid crystal panel W is not horizontally shifted from the second linear feed path P2 after the turnover, but to prevent the liquid crystal panel W from interfering with the feeding line (for example, the feeding mechanism including components of the panel feeding line L2, such rollers), the liquid crystal panel W is elevated (as indicated by the arrow D2 in FIG. 8) to a certain level different from the level at which the liquid crystal panel W is transported, and then the liquid crystal panel W is turned over about the axis A2 passing through the liquid crystal panel W, which is followed by lowering the liquid crystal panel W as indicated by the arrow D3.

In this example, the liquid crystal panel W is turned over about the axis A2 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A2 inclined by 45° with respect to the feed direction. This allows further simplification of the apparatus and a further reduction in the tact time.

It is also possible to prevent horizontal displacement of the position of the center of the liquid crystal panel W during the turnover of the liquid crystal panel W. Therefore, since there is no need to horizontally move or return the liquid crystal panel W to the original position after the turnover, the tact time can be reduced accordingly.

Figure 9:
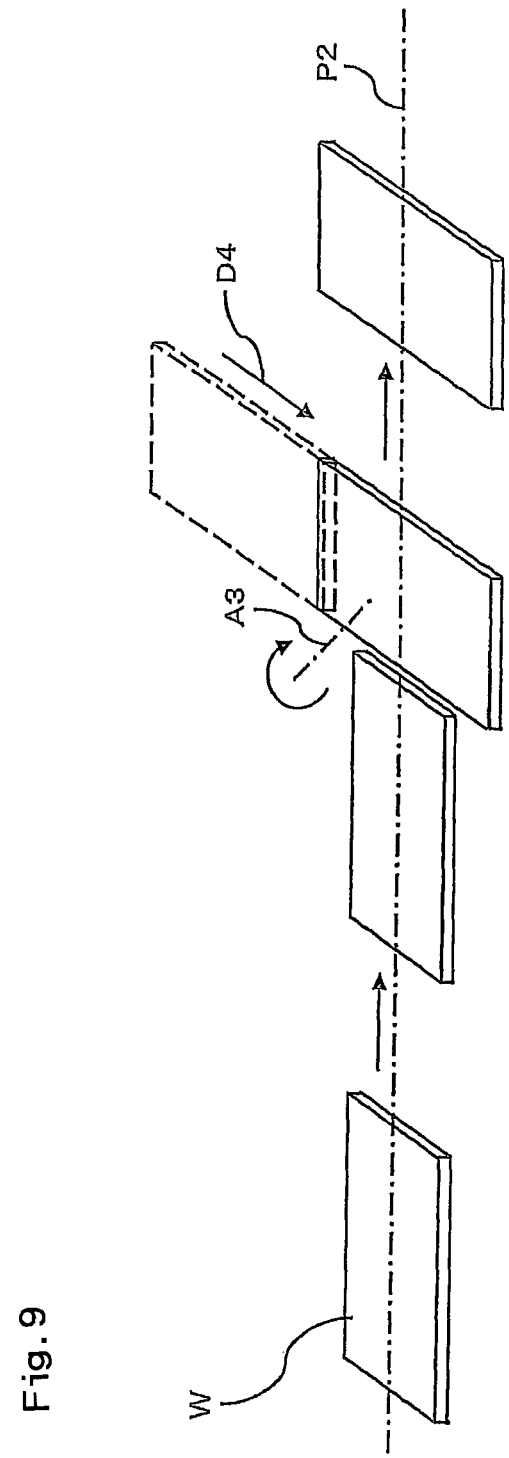
FIG. 9 is a schematic perspective view showing a further example of the method of turning over a liquid crystal panel using a panel turning mechanism.

FIG. 9 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about a single axis A3 that is not parallel to any of the long and short sides of the liquid crystal panel W. The axis A3 is inclined by 45° from the direction of feeding of the liquid crystal panel W along the second linear feed path P2 to the direction parallel to the surface of the liquid crystal panel W.

In the example shown in FIG. 9, the liquid crystal panel W is turned over about the axis A3 not passing through the liquid crystal panel W. The axis A3 preferably extends parallel to the surface of the liquid crystal panel W, more preferably extends in the same plane as the surface of the liquid crystal panel W. When the liquid crystal panel W is turned over by such a method, the liquid crystal penal W is positioned out of the second linear feed path P2 as shown by the broken lines in FIG. 9 after the turnover. Therefore, as indicated by the arrow D4 in FIG. 9, the liquid crystal panel W is preferably transferred onto the second linear feed path P2 after the turnover. According to this feature, a linear feed path can be formed for the liquid crystal panel W so that a compact manufacturing line can be formed. Alternatively, after the turnover, the liquid crystal panel W may be fed parallel to the second linear feed path P2 without being returned onto the second linear feed path P2. In this case, since there is no need to return the liquid crystal panel W to the second linear feed path P2, the tact time can be reduced correspondingly.

In this example, the liquid crystal panel W is turned over about the axis A3 so that the positional relationship between the long and short sides of the liquid crystal panel W can be reversed, which makes it possible to achieve the same effect by a single operation as in the case where the liquid crystal panel W is turned over and rotated, independently. This allows a reduction in the number of steps and simplification of the apparatus. In addition, the tact time can be reduced.

In particular, the positional relationship between the long and short sides of the liquid crystal panel W can be easily reversed only by turning over the liquid crystal panel W about the axis A3 inclined by 45° with respect to the feed direction. This allows further simplification of the apparatus and a further reduction in the tact time.

Also when the liquid crystal panel W is turned over about the axis A3 not passing through the liquid crystal panel W, the liquid crystal panel W can be prevented from interfering with the liquid crystal panel W-feeding line (such as a feeding mechanism including components of the panel feeding line L2, such as rollers) during the turnover of the liquid crystal panel W. Therefore, since there is no need to vertically change the level of the liquid crystal panel W before and after the turnover, the tact time can be reduced correspondingly. It should be noted that to reduce the tact time more effectively, the axis A3 is preferably as close to the liquid crystal panel W as possible.

Figure 10:
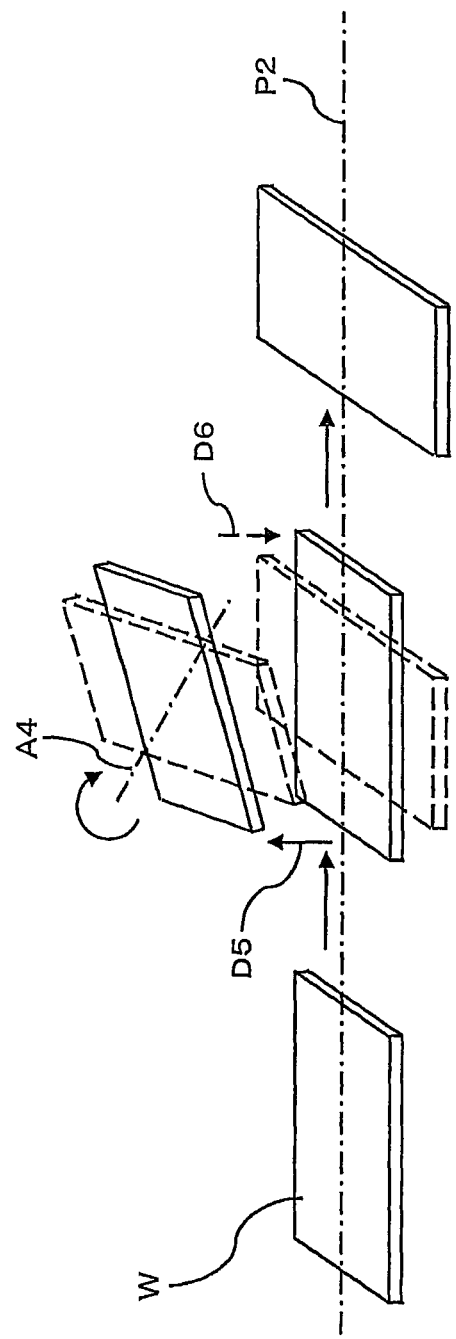
FIG. 10 is a schematic perspective view showing a further example of the method of turning over a liquid crystal panel using a panel turning mechanism.

FIG. 10 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A4 passing through the central portion of the liquid crystal panel W in a manner similar to that shown in FIG. 8, except that the liquid crystal panel W is not kept horizontal as shown in FIG. 8 when elevated but inclined with respect to the horizontal direction as indicated by the arrow D5 in FIG. 10 when elevated and that the liquid crystal panel W is turned over in the inclined state and then lowered as indicated by the arrow D6.

Figure 11:
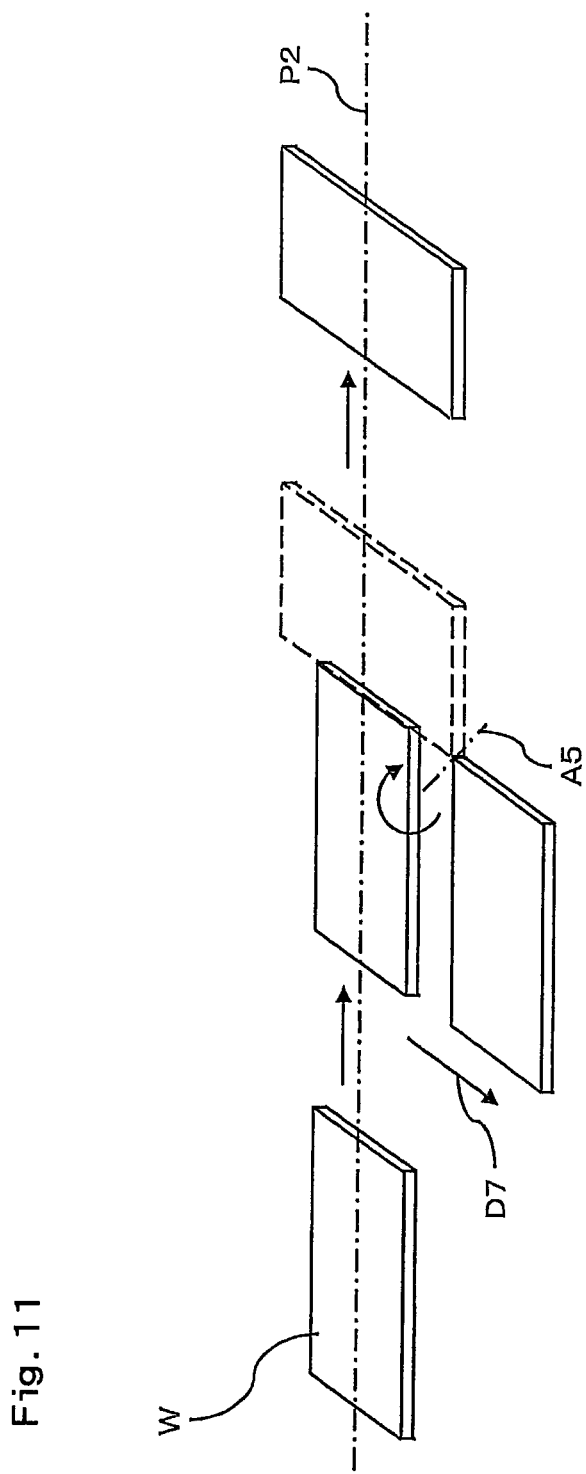
FIG. 11 is a schematic perspective view showing a further example of the method of turning over a liquid crystal panel using a panel turning mechanism.

FIG. 11 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A5 passing through a corner portion of the liquid crystal panel W in a similar manner to that shown in FIG. 6, except that the liquid crystal panel W is displaced from the second linear feed path P2 as indicated by the arrow D7 in FIG. 11 before the turnover and then turned over so that it can be transferred onto the second linear feed path P2, instead of the process shown in FIG. 6, which includes turning over the liquid crystal panel W so that it is displaced from the second linear feed path P2 and then transferring it onto the second linear feed path P2.

Figure 12:
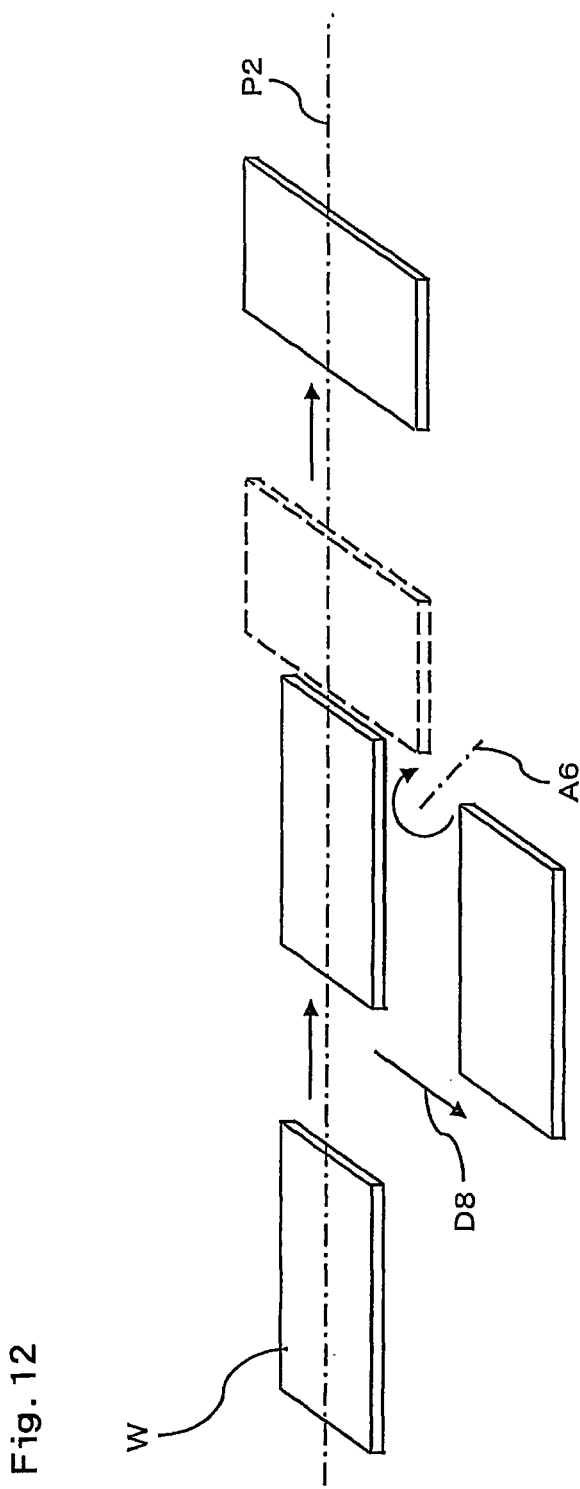
FIG. 12 is a schematic perspective view showing a further example of the method of turning over a liquid crystal panel using a panel turning mechanism.

FIG. 12 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A6 not passing through the liquid crystal panel W in a similar manner to that shown in FIG. 9, except that the liquid crystal panel W is displaced from the second linear feed path P2 as indicated by the arrow D8 in FIG. 12 before the turnover and then turned over so that it can be transferred onto the second linear feed path P2, instead of the process shown in FIG. 9, which includes turning over the liquid crystal panel W so that it is displaced from the second linear feed path P2 and then transferring it onto the second linear feed path P2.

Figure 13:
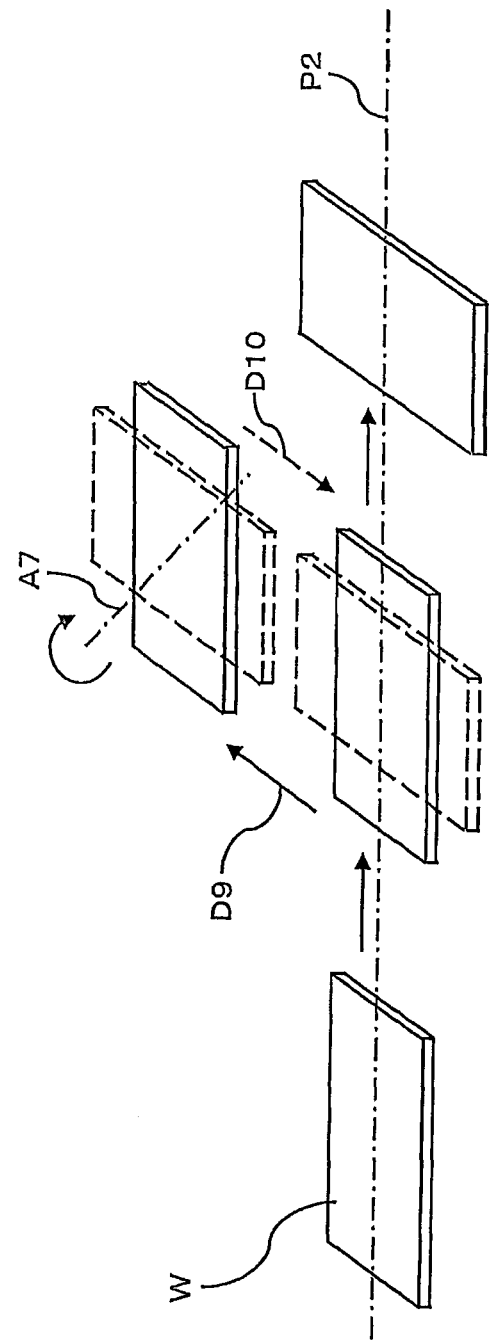
FIG. 13 is a schematic perspective view showing a further example of the method of turning over a liquid crystal panel using a panel turning mechanism.

FIG. 13 is a schematic perspective view showing a further example of the method of turning over the liquid crystal panel W using the panel turning mechanism 200. In the panel turning mechanism 200, for example, the same structure as shown in FIG. 7 may be used to form the mechanism for supporting the liquid crystal panel W, but it is non-limiting, and any of various other structures may be used.

In this embodiment, the liquid crystal panel W is turned over about an axis A4 passing through the central portion of the liquid crystal panel W in a similar manner to that shown in FIG. 8, except that the liquid crystal panel W is not elevated as shown in FIG. 8 but horizontally moved to a position where it does not interfere with the feeding line (for example, a feeding mechanism including components of the panel feeding line L2, such rollers) as indicated by the arrow D9 in FIG. 13, turned over at that position, and then moved onto the linear feed path P2 as indicated by the arrow D10.

The above are mere examples of the method of turning over the liquid crystal panel W using the panel turning mechanism 200, and the liquid crystal panel W may be turned over in various other modes.

FIGS. 14A to 14E are diagrams showing examples of how the panel turning mechanism 200 comes into contact with the surface of the liquid crystal panel W when it supports the liquid crystal panel W. In the panel turning mechanism 200, the part to be in contact with the surface of the liquid crystal panel W is preferably made of a material that is smooth and less likely to scratch the liquid crystal panel W, such as resin or rubber. It will be understood that the contact modes described below with reference to FIGS. 14A to 14E are mere examples and the panel turning mechanism 200 to be used may come into contact with the surface of the liquid crystal panel W in any of various other modes.

Figure 14A:
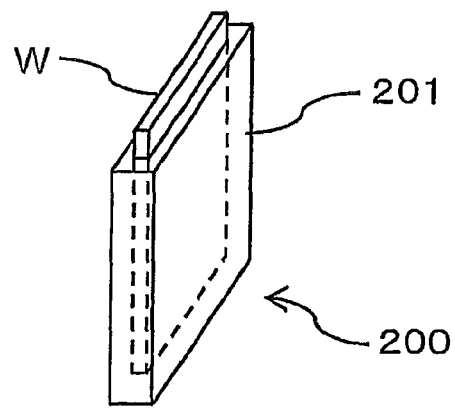
FIG. 14A is a diagram showing an example of how a panel turning mechanism comes into contact with the surface of a liquid crystal panel when it supports the liquid crystal panel.

FIG. 14A is a perspective view showing an example where the panel turning mechanism 200 comes into surface-contact with the surface of the liquid crystal panel W to support it. FIG. 14A shows a structure having a plate-shaped component 201 for holding both surfaces of the liquid crystal panel W. Such a structure is non-limiting, and the mechanism may be configured to use any other component for making surface-contact with the surface of the liquid crystal panel W.

Figure 14B:
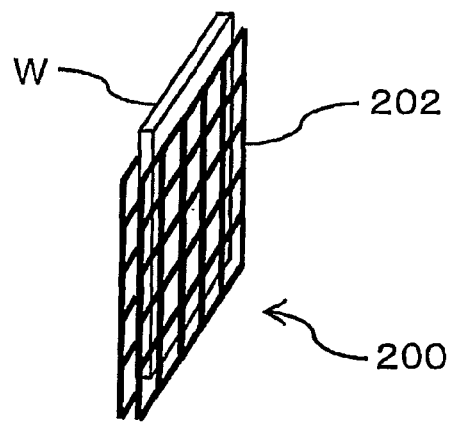
FIG. 14B is a diagram showing another example of how a panel turning mechanism comes into contact with the surface of a liquid crystal panel when it supports the liquid crystal panel.

FIG. 14B is a perspective view showing an example where the panel turning mechanism 200 comes into line-contact with the surface of the liquid crystal panel W to support it. FIG. 14B shows a structure having a network component 202 for holding both surfaces of the liquid crystal panel W. Such a structure is non-limiting, and the mechanism may be configured to use any other component for making line-contact with the surface of the liquid crystal panel W.

Figure 14C:
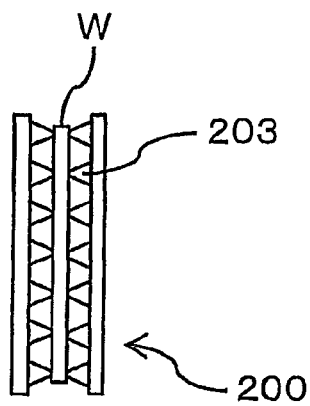
FIG. 14C is a diagram showing a further example of how a panel turning mechanism comes into contact with the surface of a liquid crystal panel when it supports the liquid crystal panel.
Figure 14D:
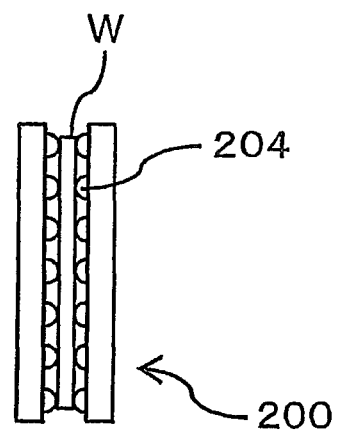
FIG. 14D is a diagram showing a further example of how a panel turning mechanism comes into contact with the surface of a liquid crystal panel when it supports the liquid crystal panel.

FIGS. 14C and 14D are side views showing examples where the panel turning mechanism 200 comes into point-contact with the surface of the liquid crystal panel W. FIG. 14C shows a structure having a plurality of tapered projections 203 for coming into contact with and holding both surfaces of the liquid crystal panel W. FIG. 14D shows a structure having rotatable bearings 204 for coming into contact with and holding both surfaces of the liquid crystal panel W. It will be understood that such structures are non-limiting, and the mechanism may be configured to use any other component for making point-contact with the surface of the liquid crystal panel W.

Figure 14E:
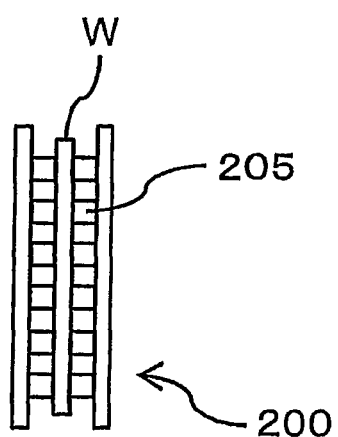
FIG. 14E is a diagram showing a further example of how a panel turning mechanism comes into contact with the surface of a liquid crystal panel when it supports the liquid crystal panel.

FIG. 14E is a side view showing an example where the panel turning mechanism 200 has a large number of surfaces coming into contact with the surface of the liquid crystal panel W to support it. FIG. 14E shows a structure having a plurality of projections 205 with end faces for coming into contact with and holding both surfaces of the liquid crystal panel W. Such a structure is non-limiting, and the mechanism may be configured to use any other component for making multi-surface-contact with the surface of the liquid crystal panel W.

FIGS. 15A to 15I are schematic plan views showing examples of which part of the liquid crystal panel W is supported by the panel turning mechanism 200. The part of the liquid crystal panel W supported by the panel turning mechanism 200 may be the whole of the surface of the liquid crystal panel W or only part of the surface of the liquid crystal panel W, for example, as shown in FIGS. 15A to 15I. The liquid crystal panel W may also be supported in any of various other modes as long as the liquid crystal panel W is not thrown from the panel turning mechanism 200 during the turnover or not overloaded during the turnover.

Figure 15A:
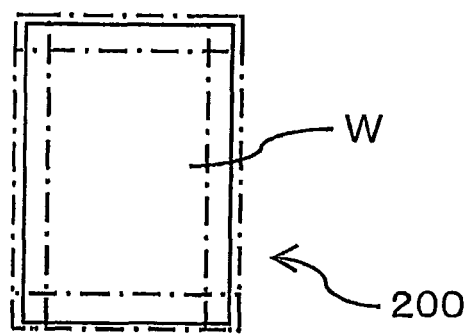
FIG. 15A is a schematic plan view showing an example of which part of a liquid crystal panel is supported by a panel turning mechanism.
Figure 15B:
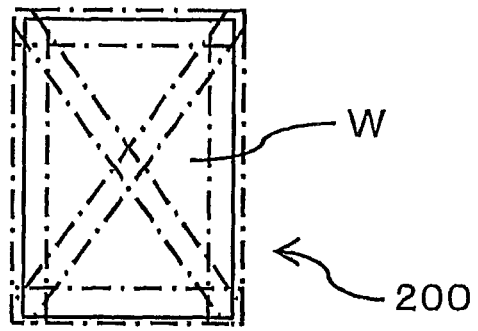
FIG. 15B is a schematic plan view showing another example of which part of a liquid crystal panel is supported by a panel turning mechanism.
Figure 15C:
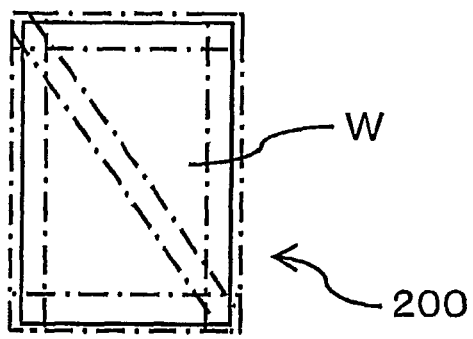
FIG. 15C is a schematic plan view showing a further example of which part of a liquid crystal panel is supported by a panel turning mechanism.
Figure 15D:
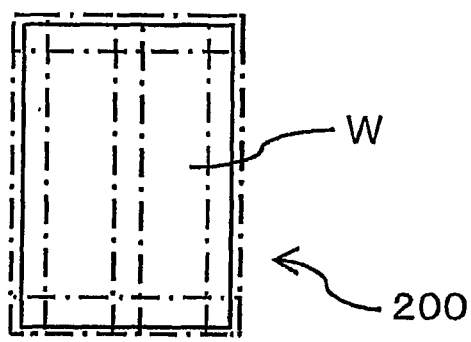
FIG. 15D is a schematic plan view showing a further example of which part of a liquid crystal panel is supported by a panel turning mechanism.
Figure 15E:
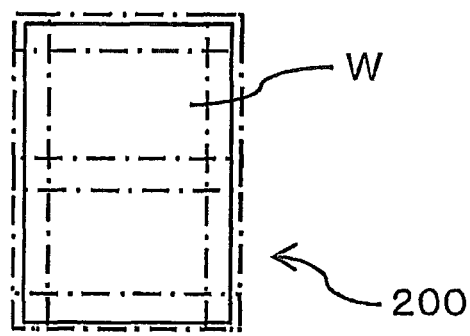
FIG. 15E is a schematic plan view showing a further example of which part of a liquid crystal panel is supported by a panel turning mechanism.
Figure 15F:
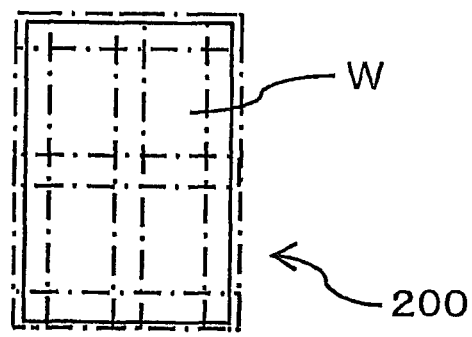
FIG. 15F is a schematic plan view showing a further example of which part of a liquid crystal panel is supported by a panel turning mechanism.
Figure 15G:
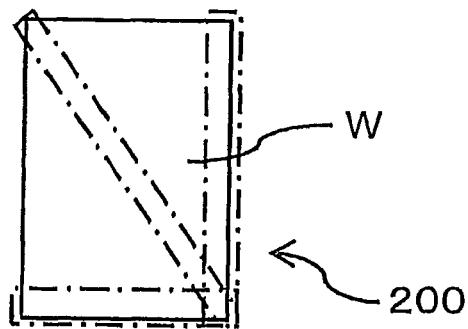
FIG. 15G is a schematic plan view showing a further example of which part of a liquid crystal panel is supported by a panel turning mechanism.
Figure 15H:
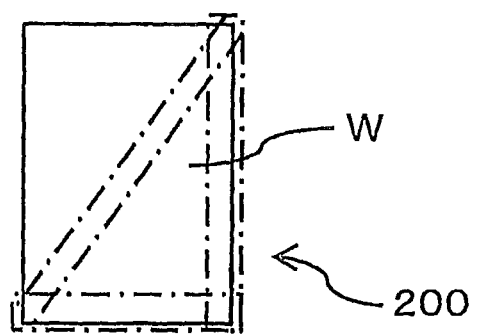
FIG. 15H is a schematic plan view showing a further example of which part of a liquid crystal panel is supported by a panel turning mechanism.
Figure 15I:
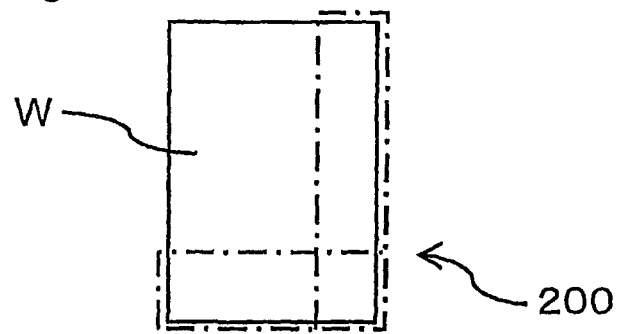
FIG. 15I is a schematic plan view showing a further example of which part of a liquid crystal panel is supported by a panel turning mechanism.

FIG. 15A shows an example where both long sides and both short sides of the liquid crystal panel W are supported. FIG. 15B shows an example where in addition to the feature shown in FIG. 15A, the liquid crystal panel W is further supported along the two diagonal lines. FIG. 15C shows an example where in addition to the feature shown in FIG. 15A, the liquid crystal panel W is further supported along one of the diagonal lines. FIG. 15D shows an example where in addition to the feature shown in FIG. 15A, the liquid crystal panel W is further supported at a center-facing part along the longitudinal direction. FIG. 15E shows an example where in addition to the feature shown in FIG. 15A, the liquid crystal panel W is further supported at a center-facing part along the transverse direction. FIG. 15F shows an example where in addition to the feature shown in FIG. 15A, the liquid crystal panel W is further supported at center-facing parts along the longitudinal and transverse directions. FIG. 15G shows an example where the liquid crystal panel W is supported at one of the long sides and one of the short sides and along one of the diagonal lines. FIG. 15H shows an example where the liquid crystal panel W is supported at one of the long sides and one of the short sides and along the other of the diagonal lines. FIG. 15I shows an example where the liquid crystal panel W is supported only at one of the long sides and one of the short sides. In this case, the supporting area facing around the long and short sides is preferably larger than that in the case shown in FIG. 15A where the liquid crystal panel W is supported at both long sides and both short sides.

As described above, the liquid crystal panel W may be supported at four sides including both long sides and both short sides (for example, as shown in FIGS. 15A to 15F) or supported at two sides including one long side and one short side (for example, as shown in FIGS. 15G to 15I). Although not shown, the liquid crystal panel W may be supported at three sides including both long sides and one short side or including one long side and both short sides.

In a more preferred structure, two sides including one long side and one short side should be supported (for example, as shown in FIGS. 15G to 15I). According to such a structure, the liquid crystal panel W can be successfully supported, not depending on the size of the liquid crystal panel W. Specifically, the structure configured to support end faces along both long sides or along both short sides (for example, as shown in FIGS. 15A to 15F) cannot support the liquid crystal panel W, when the size of the liquid crystal panel W is larger than the distance between the long side-supporting parts 201 or the short side-supporting parts 202. In contrast, as illustrated in FIGS. 15G to 15I, the structure configured to support only an end face along one long side and an end face along one short side can successfully support the liquid crystal panel W of even a larger size. Therefore, such a structure makes it possible to turn over different size liquid crystal panels W in the same panel turning mechanism 200.

In addition, the structure configured to support end faces along both long sides or along both short sides (for example, as shown in FIGS. 15A to 15F) may cause a force to act on the liquid crystal panel W from the opposed long side-supporting parts 201 or the opposed short side-supporting parts 202, so that an excessive load may be applied to the liquid crystal panel W to cause cracking, chipping or bending of the liquid crystal panel W. In contrast, as illustrated in FIGS. 15G to 15I, the structure configured to support only an end face along one long side and an end face along one short side can prevent such problems. This advantageous effect becomes more significant as the size of the liquid crystal panel W increases.

In addition, when the liquid crystal panel W is supported only at an end face along one long side and at an end face along one short side as shown in FIGS. 15G to 15I, the long side-supporting part 201 and the short side-supporting part 202 only have to be in contact with these end faces, so that the time required to support the liquid crystal panel W can be reduced as much as possible, which can increase the production efficiency. In contrast, the structure configured to support end faces along both long sides or along both short sides (for example, as shown in FIGS. 15A to 15F) requires a process including bringing the long side-supporting part 201 or the short side-supporting part 201 into contact with one end face along one long or short side and then bringing the long side-supporting part 201 or the short side-supporting part 202 into contact with the other end face along the other long or short side, which increases the number of steps and the time required to support the liquid crystal panel W.

When the liquid crystal panel W is supported only at an end face along one long side and at an end face along one short side as shown in FIGS. 15G to 15I, it is preferred that as in the configuration shown in FIG. 7, the long side-supporting part 201 should come into contact with only an end face along a closer-to-axis-A1 long side of the liquid crystal panel W to support the liquid crystal panel W, and the short side-supporting part 202 should come into contact with only an end face along a closer-to-axis-A1 short side of the liquid crystal panel W to support the liquid crystal panel W. In this case, the liquid crystal panel W can be turned over while the liquid crystal panel W is supported at an end face along one long side and at an end face along one short side by the long side-supporting part 201 and the short side-supporting part 202, respectively, from the lower side, so that the liquid crystal panel W is prevented from interfering with the liquid crystal panel W-feeding line (such as a feeding mechanism including components of the panel feeding line L2, such as rollers).

EXAMPLES

A description is given below of the results of the measurement of the incidence of cracking or chipping of liquid crystal panels W in a case where the panel turning mechanism 200 configured as shown in FIG. 7 was used to turn over liquid crystal panels W of a large size (such as 32 inches or more) about the axis A1 not parallel to any of the long and short sides of the liquid crystal panel W (oblique axis turnover method) and in a case where liquid crystal panels W were turned over about an axis parallel to the long side of the liquid crystal panel W (lateral axis turnover method).

Example 1

In Example 1, 32-inch liquid crystal panels W were turned over by the oblique axis turnover method. As a result, the incidence of cracking or chipping of the liquid crystal panels W was 1%.

Example 2

In Example 2, 40-inch liquid crystal panels W were turned over by the oblique axis turnover method. As a result, the incidence of cracking or chipping of the liquid crystal panels W was 1%.

Example 3

In Example 3, 65-inch liquid crystal panels W were turned over by the oblique axis turnover method. As a result, the incidence of cracking or chipping of the liquid crystal panels W was 2%.

Example 4

In Example 4, 82-inch liquid crystal panels W were turned over by the oblique axis turnover method. As a result, the incidence of cracking or chipping of the liquid crystal panels W was 3%.

Comparative Example 1

In Comparative Example 1, 32-inch liquid crystal panels W were turned over by the lateral axis turnover method. As a result, the incidence of cracking or chipping of the liquid crystal panels W was 1%.

Comparative Example 2

In Comparative Example 2, 40-inch liquid crystal panels W were turned over by the lateral axis turnover method. As a result, the incidence of cracking or chipping of the liquid crystal panels W was 2%.

Comparative Example 3

In Comparative Example 3, 65-inch liquid crystal panels W were turned over by the lateral axis turnover method. As a result, the incidence of cracking or chipping of the liquid crystal panels W was 15%.

Comparative Example 4

In Comparative Example 4, 82-inch liquid crystal panels W were turned over by the lateral axis turnover method. As a result, the incidence of cracking or chipping of the liquid crystal panels W was 23%.

From the results of the measurement, it has been found that the incidence of cracking or chipping of liquid crystal panels W is higher when the liquid crystal panels W of the same size are turned over by the lateral axis turnover method than when they are turned over by the oblique axis turnover method. In particular, as the size of the liquid crystal panels W increased (for example, to 40 inches or more), the occurrence of cracking or chipping of the liquid crystal panels W became more frequent. The measurement results are summarized in Table 1 below.

TABLE 1

|  | Method | Panel size (inch) | Incidence (%) of panel cracking or chipping |
| --- | --- | --- | --- |
| Example 1 | Oblique axis turnover | 32 | 1 |
| Example 2 |  | 40 | 1 |
| Example 3 |  | 65 | 2 |
| Example 4 |  | 82 | 3 |
| Comparative Example 1 | Lateral axis turnover | 32 | 1 |
| Comparative Example 2 |  | 40 | 2 |
| Comparative Example 3 |  | 65 | 15 |
| Comparative Example 4 |  | 82 | 23 |

What is claimed is:

1. A system for manufacturing a liquid crystal display device by bonding sheet pieces of optical functional films comprising polarizing films to both surfaces of a rectangular liquid crystal panel having a pair of long sides and a pair of short sides, comprising:
a panel turning mechanism for turning over the liquid crystal panel after one of the sheet pieces of optical functional films is bonded to the liquid crystal panel and before another of the sheet pieces of optical functional films is bonded thereto, wherein
the panel turning mechanism has: a long side-supporting part for supporting the liquid crystal panel by coming into contact with an end face along at least one long side of the liquid crystal panel; and a short side-supporting part for supporting the liquid crystal panel by coming into contact with an end face along at least one short side of the liquid crystal panel,
the panel turning mechanism is configured to turn over the liquid crystal panel about a single axis neither parallel to the long side of the liquid crystal panel nor to the short side of the liquid crystal panel in such a manner that the positional relationship between the long and short sides of the liquid crystal panel is reversed such that the long side of the liquid crystal panel after the turnover is parallel to the short side before the turnover, and the short side of the liquid crystal panel after the turnover is parallel to the long side before the turnover.

2. The system according to claim 1, wherein
the long side-supporting part comes into contact with only an end face along one long side of the liquid crystal panel to support the liquid crystal panel, and
the short side-supporting part comes into contact with only an end face along one short side of the liquid crystal panel to support the liquid crystal panel.

3. The system according to claim 2, wherein
the long side-supporting part comes into contact with only an end face along a long side of the liquid crystal panel to support the liquid crystal panel, wherein the long side is closer to the single axis, and
the short side-supporting part comes into contact with only an end face along a short side of the liquid crystal panel to support the liquid crystal panel, wherein the short side is closer to the single axis.

4. The system according to claim 1, wherein the panel turning mechanism has a both surface-contact part for coming into contact with at least part of both surfaces of the liquid crystal panel.

5. The system according to claim 1, wherein the panel turning mechanism turns over the liquid crystal panel about an axis inclined by 45° from a direction of feeding of the liquid crystal panel to a direction parallel to the surface of the liquid crystal panel.

6. The system according to claim 1, which is for manufacturing the liquid crystal display device by a process comprising feeding optical functional films from first and second continuous rolls with different widths, respectively, which are each formed by winding, into a roll, a long optical functional film comprising a polarizing film, transversely cutting the optical functional films to form sheet pieces of the optical functional films, and bonding the sheet pieces to both surfaces of the rectangular liquid crystal panel.

7. The system according to claim 1, which is for manufacturing the liquid crystal display device by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of the rectangular liquid crystal panel.

8. The system according to claim 1, wherein the length of the long side-supporting part is longer than the length of the short side-supporting part.

* * * * *